US012294808B2

(12) United States Patent
French et al.

(10) Patent No.: US 12,294,808 B2
(45) Date of Patent: May 6, 2025

(54) APPARATUS FOR ATTACHING ACCESSORIES TO A FIRST-PERSON VIEW HEADSET

(71) Applicant: Unusual Machines, Inc., Orlando, FL (US)

(72) Inventors: Gregory French, Shenzhen (CN); Anthony Cake, Givrins (CH); Allan Evans, George Town (KY)

(73) Assignee: Unusual Machines, Inc., Orlando, FL (US)

( * ) Notice: Subject to any disclaimer, the term of this patent is extended or adjusted under 35 U.S.C. 154(b) by 561 days.

(21) Appl. No.: 17/187,838

(22) Filed: Feb. 28, 2021

(65) Prior Publication Data

US 2021/0281797 A1  Sep. 9, 2021

(30) Foreign Application Priority Data

Mar. 6, 2020 (CN) .......................... 202010150301.8

(51) Int. Cl.
| | |
|---|---|
| H04N 5/64 | (2006.01) |
| B64U 20/87 | (2023.01) |
| H01Q 1/27 | (2006.01) |
| H04N 5/44 | (2011.01) |
| G06F 1/16 | (2006.01) |

(52) U.S. Cl.
CPC ............... H04N 5/64 (2013.01); B64U 20/87 (2023.01); H01Q 1/273 (2013.01); H04N 5/44 (2013.01); G06F 1/163 (2013.01)

(58) Field of Classification Search
None
See application file for complete search history.

(56) References Cited

U.S. PATENT DOCUMENTS

| | | | | |
|---|---|---|---|---|
| 5,711,033 A | * | 1/1998 | Green | F04D 17/16 2/424 |
| 8,903,568 B1 | * | 12/2014 | Wang | G05D 1/0094 701/2 |
| 2013/0003013 A1 | * | 1/2013 | Collins | G02C 5/146 351/116 |

(Continued)

FOREIGN PATENT DOCUMENTS

WO  2019225922 A1  11/2019

OTHER PUBLICATIONS

Eachine EV300O OLED FPV Goggles User Manual v1.1, Jul. 2020.

(Continued)

*Primary Examiner* — Samira Monshi
(74) *Attorney, Agent, or Firm* — Nicholson De Vos Webster & Elliott LLP; Judith Szepesi

(57) ABSTRACT

Disclosed herein is a first-person view (FPV) headset comprising a shell and a fan plate coupled to the shell, wherein the fan plate comprises an attachment point configured to receive a headset accessory. The attachment point may comprise a hinge mount and/or a quick-release connector (e.g., comprising a pin, a screw, a button, a magnet). The attachment point may include an electrical connector for power and/or data. Also disclosed are accessories (e.g., an antenna, an antenna mount, a digital video receiver) with physical features that are complementary to the attachment point, thereby enabling them to be attached to the FPV headset.

22 Claims, 4 Drawing Sheets

(56) References Cited

U.S. PATENT DOCUMENTS

| | | | |
|---|---|---|---|
| 2013/0312151 A1* | 11/2013 | North | A61F 9/06 |
| | | | 2/8.2 |
| 2017/0060177 A1 | 3/2017 | Rahim et al. | |
| 2018/0093177 A1* | 4/2018 | Tokubo | A63F 13/327 |
| 2018/0098465 A1* | 4/2018 | Reynolds | G02B 27/028 |
| 2019/0132999 A1 | 5/2019 | Reynolds et al. | |
| 2019/0350279 A1* | 11/2019 | Clemente | A41D 13/0025 |
| 2020/0329806 A1* | 10/2020 | Wong | H01M 50/10 |

OTHER PUBLICATIONS

Fat Shark Dominator HD2 Model FSV1074 User Manual, Revision B, Sep. 22, 2015.
Fat Shark Dominator HDO2 Model FSV1123 User Manual, Oct. 26, 2019.
Jim T., Spektrum Focal DVR FPV Headset, Jul. 7, 2017.
ORQA FPV Video Goggles FPV.ONE User Manual, Rev. 1.6, Sep. 2020.

* cited by examiner

APPARATUS FOR ATTACHING ACCESSORIES TO A FIRST-PERSON VIEW HEADSET

CROSS-REFERENCE TO RELATED APPLICATIONS

This application claims priority to, and hereby incorporates by reference the entirety of the contents of, China patent application No. 202010150301.8, filed Mar. 6, 2020 and entitled "APPARATUS FOR ATTACHING ACCESSORIES TO A FIRST-PERSON VIEW HEADSET."

BACKGROUND

Pilots of unmanned aerial vehicles (UAVs), such as drones, often use digital goggles or a display headset to get a first-person view (FPV) from the aerial vehicle. These headsets are designed for portability. Components needed for operation can be attached to the headset or the headband. Most FPV headsets are designed with either a modular bay or internal components for the video signal receiver (VRx).

The quality of the video signal provided to the wearer of a headset is related not only to the electronics inside the headset, but also to the type(s) and location(s) of the antenna(s). Many antennas have directional sensitivity, and it can improve performance to place the antennas on the front of the headset to allow the pilot to "face" the aerial platform with high sensitivity. In addition to antennas, most modern FPV goggles have a fan that is used to prevent the optics from fogging.

Because headsets have limited size, it can be difficult to add additional components such as long-range antennas or a digital video receiver to a headset. It can also be difficult to quickly add or remove different components depending on the headset configuration the pilot prefers for various applications.

There is a need, therefore, for a more flexible approach to FPV headsets and accessories.

SUMMARY

This summary represents non-limiting embodiments of the disclosure.

Disclosed herein are apparatuses for attaching accessories to first-person view (FPV) headsets, and accessories for attachment to such FPV headsets.

In some embodiments, a FPV headset comprises a shell and a fan plate coupled to the shell, wherein the fan plate comprises an attachment point configured to receive a headset accessory. In some embodiments, the attachment point comprises a hinge mount. In some embodiments, the attachment point comprises a quick-release connector (e.g., a pin, a screw, or a button). In some embodiments, the attachment point comprises a magnet.

In some embodiments, the attachment point comprises at least one electrical connector. In some embodiments in which the attachment point comprises at least one electrical connector, the FPV headset further comprises a fan, and the at least one electrical connector is configured to provide power to the fan. In some embodiments in which the attachment point comprises at least one electrical connector, the headset accessory comprises a video receiver, and the at least one electrical connector is configured to convey data to or from the video receiver.

In some embodiments, the fan plate comprises at least two distinct pieces. In some embodiments, the fan plate is a unitary piece.

In some embodiments, the attachment point comprises a secondary connection. In some embodiments, the secondary connection is configured to provide power or deliver data to the FPV headset. In some embodiments, the secondary connection comprises a hinged joint.

In some embodiments, the headset accessory comprises an antenna or a video receiver, or an extended antenna mount.

In some embodiments, the FPV headset further comprises a video receiver, and the attachment point comprises an electrical connector coupled to the video receiver, wherein the electrical connector is configured to provide signals from an antenna to the video receiver.

In some embodiments, a FPV headset accessory (e.g., an antenna, a video receiver) comprises a connector that is complementary to the attachment point of the FPV headset. For example, the connector may be the other half of a hinge mount to mate with the attachment point, a magnet that attracts the attachment point, etc.

In some embodiments, a FPV headset comprises a shell having a top, a bottom, and a forward-facing portion, and a mount attached to the top of the shell and configured to receive one or more accessories. In some embodiments, the shell comprises at least one hole, and the mount is attached to the top of the shell by a pin or screw through the at least one hole. In some embodiments, the shell (and/or mount) comprises a magnet, and the mount is attached to the shell magnetically. In some embodiments, the FPV headset also includes a head strap coupled to the mount.

In some embodiments, the mount replaces a fan plate.

In some embodiments, the FPV headset also includes a fan, and the mount is disposed between the shell and the fan.

BRIEF DESCRIPTION OF THE DRAWINGS

Objects, features, and advantages of the disclosure will be readily apparent from the following description of certain embodiments taken in conjunction with the accompanying drawings in which.

Figure 1A:
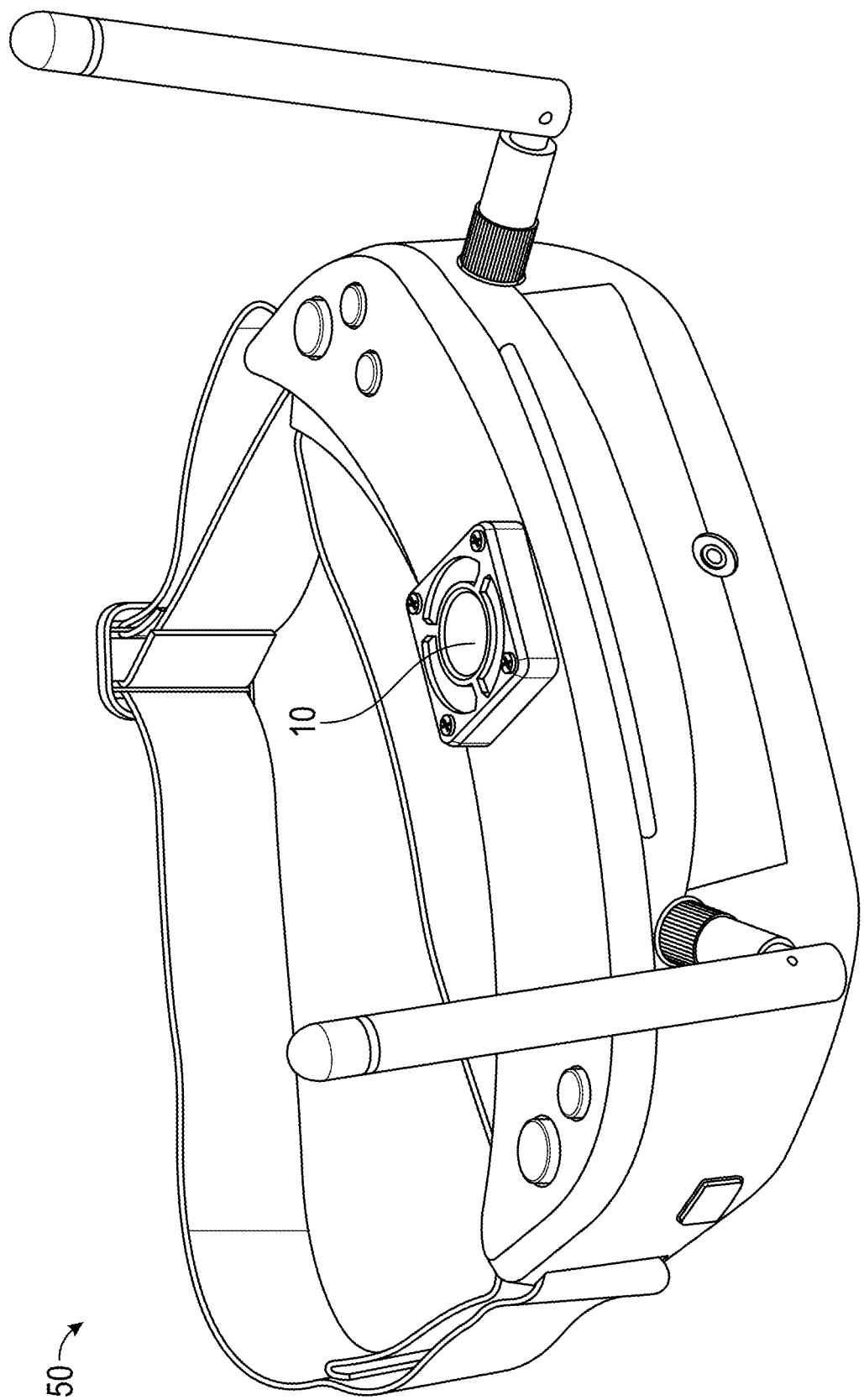
FIG. 1A shows a prior art headset.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

Unmanned aerial vehicles (UAVs), such as drones, often include an on-board video camera that can be used to allow a pilot to fly the UAV in a first-person view (FPV) mode.

Specifically, the video camera gives the pilot a view from the UAV, thereby allowing the pilot a view he or she would have if actually aboard the UAV.

To access the FPV, UAV pilots typically wear digital goggles or a display headset (referred to generally herein as a "FPV headset" or simply a "headset"). The headset, typically in wireless communication with the UAV, can display images and videos from the UAV camera to provide the FPV to the pilot.

FPV headsets can include a variety of components to allow them to provide the FPV (e.g., optics, a video receiver, one or more antennas, etc.) as well as components to improve the experience for the pilot (e.g., a fan to mitigate fogging of the optics). It can be desirable to mount some of these components on the outside of the headset, sometimes on the front of the headset. For example, because many antennas have directional sensitivity, it can improve performance to place one or more antennas on the front of the headset to provide high sensitivity when the pilot's face is directed toward the UAV he or she is flying.

It can also be desirable to provide pilots with the ability to add components to or remove components from a headset to accommodate different users' needs or preferences. But because headsets have limited size and locations for attaching accessories, it can be difficult to add components to a headset. Depending on how components are attached to and detached from a headset, it can also be challenging to quickly add or remove different components depending on the headset configuration the pilot prefers for various applications.

Figure 1B:
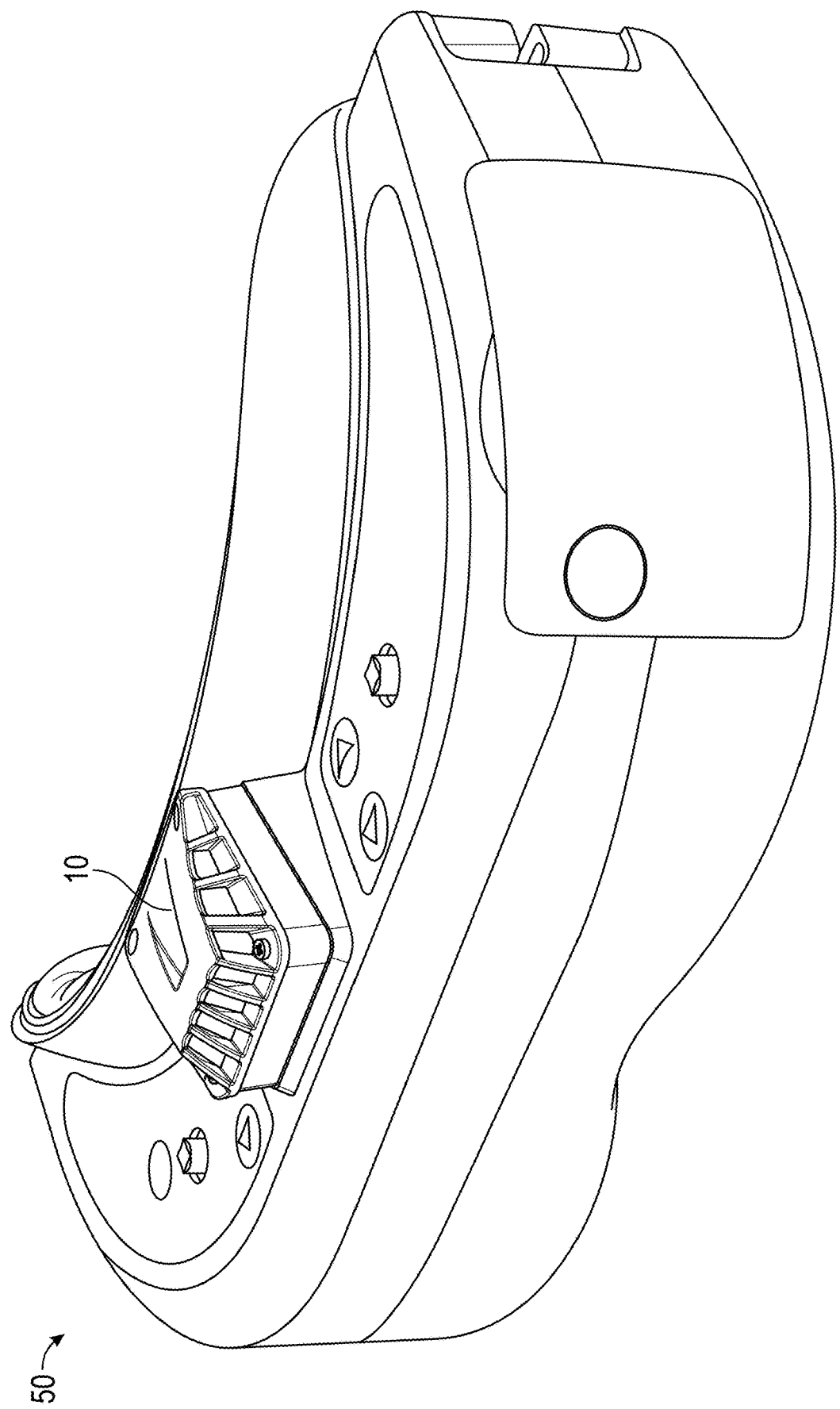
FIG. 1B shows another prior art headset.

FIGS. 1A and 1B illustrate prior art headsets 50 that can provide FPVs to pilots. These prior-art headsets 50 include a fan 10 that is typically located at the top center of the headset 50, as shown in FIGS. 1A and 1B. The fan 10 provides a stream of air to mitigate or prevent fogging of the optics in the headset 50.

Disclosed herein is a FPV headset with a new mount that provides an attachment point for accessories to be added to the FPV headset. The mount may replace the fan plate, or it may be a modified fan plate that includes the attachment point. The mount may be an insert that is disposed between the shell of the headset and the fan. The mount may be a unitary piece, or it may comprise multiple pieces that are assembled together to make the mount. The mount may have a single attachment point, or it may have multiple attachment points for one or more accessories. The mount may interact with and/or connect with attached accessories or integrated (non-removable) components, or it may couple two or more other accessories and/or components together to enable them to communicate and/or share power.

Also disclosed herein is a FPV headset mounting system that uses a modified fan plate as an attachment point. The mounting system may comprise a hinge, a magnet, or any other mechanism allowing accessories to be attached to the FPV headset via the attachment point. The mounting system may have an attachment/detachment mechanism that facilitates rapid attachment/detachment of accessories. The mounting system may provide a path for electrical signals (e.g., power, data) between accessories or portions of the FPV headset. The mounting system may replace the fan. The mounting system may be an insert disposed between the shell of the FPV headset and the fan. The mounting system may be configured to be attached to a head strap of the FPV headset.

Also disclosed herein is a FPV headset accessory that is configured to be attached to the mount described above. The accessory can be quickly attached or detached. The accessory can be, for example, an extended antenna through which the antenna signals can be directly connected to an analog video receiver in an analog module bay of the FPV headset. Alternatively or in addition, the accessory can be a digital video receiver. The accessory may have additional mounting points for antennas. The accessory may have secondary cables to directly power the attached device and/or to transmit a video signal to an input on the headset.

In some of the embodiments disclosed herein, a new fan plate is provided as an attachment point for accessories. The new fan plate, referred to herein as an attachment point fan plate, allows additional accessories to be attached to the FPV headset.

Figure 2:
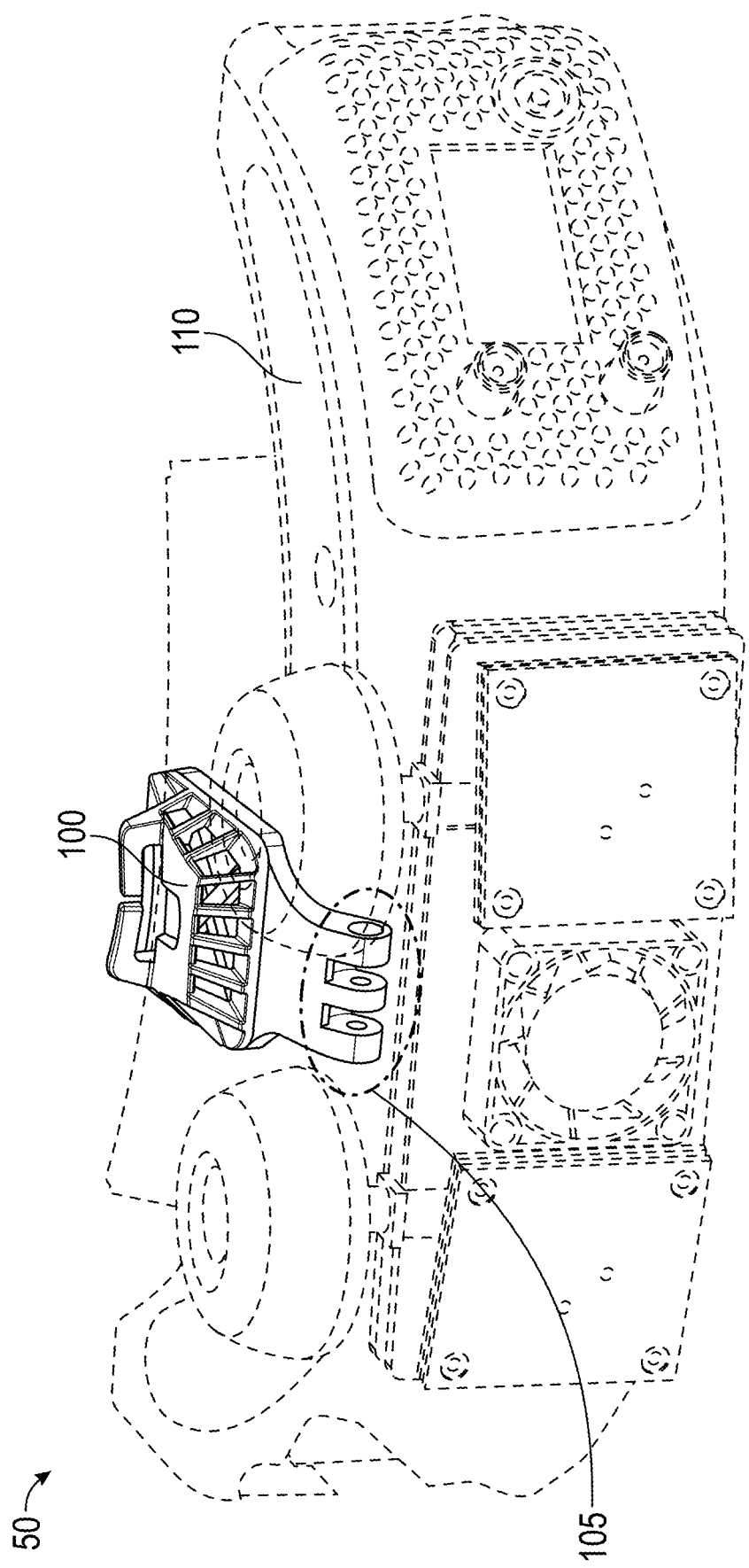
FIG. 2 illustrates an exemplary fan plate in accordance with some embodiments.

FIG. 2 illustrates a headset 50 that comprises an exemplary attachment point fan plate 100 in accordance with some embodiments. As shown in FIG. 2, the attachment point fan plate 100 comprises an attachment point 105, illustrated as a hinge mount, that can receive an accessory (e.g., module, component, etc.) that includes a corresponding, complementary connector (e.g., the other half of the hinge). For example, the attachment point 105 shown in FIG. 2 can receive an accessory (e.g., antenna, antenna module, digital video receiver, etc.) that includes a connector with two complementary protrusions that fit between the three protrusions shown in the attachment point 105 of in FIG. 2. A pin can then be inserted to hold the accessory in place.

FIG. 2 also shows a module 110, which may be attached to the headset 50 via the attachment point fan plate 100, as described in further detail below. The module 110 shown has four antennas, a digital video receiver, and a fan, but it is to be understood that the illustrated module is merely exemplary. In general, any type of accessory can be attached via the attachment point fan plate 100.

In some embodiments, the attachment point fan plate 100 comprises multiple pieces that are assembled together to make the attachment point fan plate 100. In some embodiments, the attachment point fan plate 100 is a unitary piece (i.e., an undivided, whole piece as opposed to a part made from pieces that are assembled or connected together).

In some embodiments, the attachment point fan plate 100 is attached to the shell of the FPV headset by one or more screws. In some embodiments, attachment point the fan plate 100 can be removed, augmented, replaced, etc. to allow a single set of one or more screw holes to act as a solid fixation location for an alternative mount. This alternative mount can also be designed to press against the shell of the headset.

In some embodiments, the attachment point fan plate 100 is attached to the shell of the FPV headset via a magnetic mechanism. In some embodiments, the attachment point fan plate 100 can be removed, augmented, replaced, etc. to allow a magnet in the FPV headset to act as a fixation location for an alternative mount.

In some embodiments, the attachment point fan plate 100 allows the attachment of a head strap to the headset.

In some embodiments including an attachment point fan plate 100, power provided to the fan is also or alternatively available to power whatever module or accessory is attached or coupled to to the FPV headset via the attachment point fan plate 100. In some embodiments including an attachment point fan plate 100, the attachment point fan plate 100 provides a data connection to a connected module or accessory. In some embodiments including an attachment point fan plate 100, both power and data connections are available through the attachment point fan plate 100 to an attached module or accessory.

In other embodiments, the attachment point fan plate 100 provides only a mechanical attachment point, and data and/or power is not provided through the attachment point fan plate 100. In some embodiments, an attached module or accessory is powered by and/or has a data connection via a port unrelated to and distinct from the attachment point fan plate 100 (e.g., an analog module port). In some embodiments, the attached module or accessory is an extension of an analog module of the FPV headset.

In some embodiments, the attachment point fan plate 100 provides a secondary connection with a quick-release mechanism. As used herein, the term "quick-release mechanism" means a mechanism that facilitates the attachment and release of accessories without a substantial investment of time. In other words, a quick-release mechanism allows prompt attachment and release of accessories, such that the amount of time required to attach or release an accessory is not burdensome for the user. It is to be understood that quick-release mechanisms may require the user to use a tool (e.g., a screwdriver, a hex key, etc.) or expend some effort (e.g., pull a pin, turn a screwdriver, turn a hex key, etc.). In other words, a quick-release mechanism is not required to allow instantaneous attachment or removal of an accessory. For example, the quick-release mechanism may include a pin, a screw, or a button. As another example, the quick-release mechanism may be magnetic. For example, the attachment point fan plate 100 may comprise a magnet, and accessories to be attached to the attachment point fan plate 100 have properties such that they are attracted to the magnet in the attachment point fan plate 100 (e.g., accessories may include magnets having the opposite polarity of the magnet in the attachment point fan plate 100, they may comprise a metal that is attracted to the magnet in the attachment point fan plate 100, etc.).

In some embodiments, the secondary connection comprises a hinge joint that may allow adjustments to be made to the orientation of an attached accessory.

In some embodiments, the attached module or accessory is nonfunctional. For example, the attached module or accessory can be decorative or attached for aesthetic reasons rather than for utilitarian purposes. For example, the attached module or accessory could be a medallion or badge with a team logo. In some embodiments, the attached module or accessory is attached magnetically.

In some embodiments, the FPV headset includes an accessory mounting plate, which could be, but is not required to be, a fan plate or a replacement for a fan plate (e.g., the attachment point fan plate 100 described above). In some such embodiments, the accessory mounting plate comprises a quick-release attachment point to allow multiple types of accessories to be attached to the FPV headset via the mount. For example, in some embodiments the attachment point comprises a pin, and different attachments can be attached and removed quickly by replacing a single pin. In some embodiments, the quick-release attachment point is included in the fan plate. In other embodiments, the quick-release attachment point is distinct from the fan plate.

In some embodiments having a quick-release attachment point, the quick-release mechanism comprises a pin, a screw, or a button. In some embodiments, the quick-release attachment mechanism is magnetic.

Figure 3A:
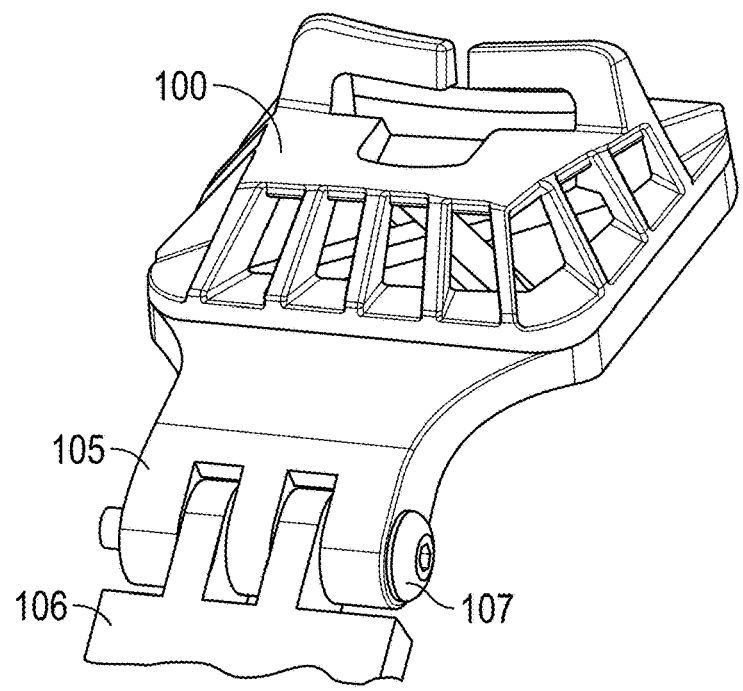
FIG. 3A illustrates an exemplary fan plate with a hinge mount and an accessory attached in accordance with some embodiments.

FIG. 3A illustrates the attachment point fan plate 100 with an accessory attached in accordance with some embodiments. The attachment point 105 is illustrated mated to a corresponding, complementary connector 106 (e.g., the other half of the hinge). The connector 106 has two complementary protrusions that fit between the three protrusions of the attachment point 105. A pin 107 is inserted to hold the accessory in place.

Figure 3B:
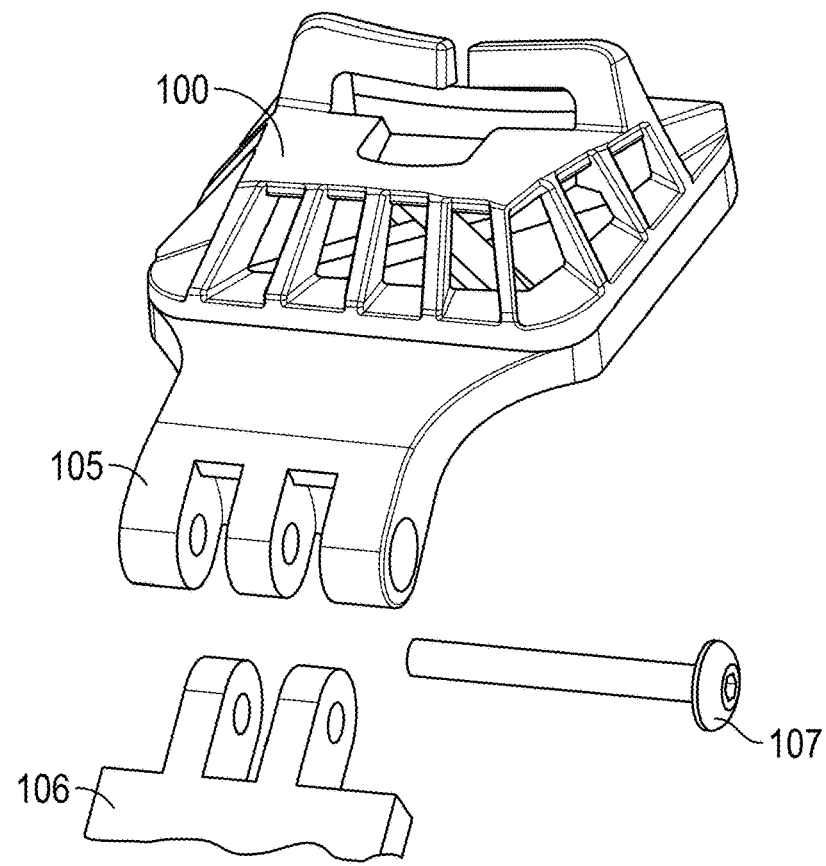
FIG. 3B is an exploded view of the components shown in FIG. 3A.

FIG. 3B is an exploded view of the attachment point fan plate 100, the connector 106, and the pin 107. Although FIGS. 3A and 3B illustrate a pin 107, the pin 107 can be any suitable fastener, such as, for example, a screw, a cotter pin, clevis pin, dowel pin, grooved pin, hitch pin, lynch pin, spring pin, taper pin, nut and bolt, or the like.

Similarly, although FIGS. 2, 3A, and 3B illustrate the attachment point 105 as being part of a hinge, it is to be appreciated that other types of connectors may be used instead. Moreover, the connector 106 may be released from the attachment point 105 by a quick-release mechanism, such as a spring-activated button.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

The term "coupled" is used herein to express a direct connection/attachment as well as a connection/attachment through one or more intervening elements or structures.

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A first-person view (FPV) headset capable of providing a first-person view to a pilot of an unmanned vehicle, the FPV headset comprising:
   a shell having an exterior and an interior;
   optics situated within the interior of the shell; and
   a fan plate coupled to an exterior of the shell, wherein the fan plate comprises an attachment point configured to receive a headset accessory.

2. The FPV headset recited in claim 1, wherein the attachment point comprises a portion of a hinge mount.

3. The FPV headset recited in claim 1, wherein the attachment point comprises a quick-release connector.

4. The FPV headset recited in claim 3, wherein the quick-release connector comprises a pin, a screw, a button, or a magnet.

5. The FPV headset recited in claim 1, wherein the attachment point comprises at least one electrical connector.

6. The FPV headset recited in claim 5, further comprising a fan situated to mitigate fogging of the optics, and wherein the at least one electrical connector is configured to provide power to the fan.

7. The FPV headset recited in claim 5, wherein the headset accessory comprises a video receiver, and wherein the at least one electrical connector is configured to convey data to or from the video receiver.

8. The FPV headset recited in claim 1, wherein the fan plate comprises at least two distinct pieces.

9. The FPV headset recited in claim 1, wherein the fan plate is a unitary piece.

10. The FPV headset recited in claim 1, wherein the attachment point comprises a secondary connection.

11. The FPV headset recited in claim 10, wherein the secondary connection is configured to provide power or deliver data to one or more components of the FPV headset.

12. The FPV headset recited in claim 10, wherein the secondary connection comprises a hinged joint.

13. The FPV headset recited in claim 1, further comprising a video receiver, and wherein the attachment point comprises an electrical connector coupled to the video receiver, wherein the electrical connector is configured to provide signals from an antenna to the video receiver.

14. A FPV headset accessory comprising a connector complementary to the attachment point of the FPV headset recited in claim 1.

15. The FPV headset accessory recited in claim 14, wherein the FPV headset accessory comprises at least one antenna or a video receiver.

16. A first-person view (FPV) headset capable of providing a first-person view to a pilot of an unmanned vehicle, the FPV headset comprising:
    a shell having a top, a bottom, an interior, an exterior, and a forward-facing portion;
    optics situated in the interior of the shell; and
    a mount attached to the top of the shell on the exterior of the shell and configured to receive one or more accessories.

17. The FPV headset recited in claim 16, wherein the shell comprises at least one hole, and wherein the mount is attached to the top of the shell by a pin or screw through the at least one hole.

18. The FPV headset recited in claim 16, wherein the shell comprises a magnet, and wherein the mount is magnetically attached to the top of the shell.

19. The FPV headset recited in claim 16, wherein the mount comprises a magnet.

20. The FPV headset recited in claim 16, further comprising a head strap coupled to the mount.

21. The FPV headset recited in claim 16, wherein the mount replaces a fan plate.

22. The FPV headset recited in claim 16, further comprising a fan situated to mitigate fogging of the optics, and wherein the mount is disposed between the shell and the fan.

* * * * *